Sept. 19, 1967  A. R. D. GILES  3,343,014
SYNCHRONOUS MOTORS
Filed Nov. 10, 1964  2 Sheets-Sheet 1

SWITCHING SEQUENCE -200 STEPS PER REV.

| STEP | SW. 21 | SW. 22 |
|---|---|---|
| 1 | X | Z |
| 2 | Y | Z |
| 3 | Y | W |
| 4 | X | W |
| 5(=1) | X | Z |

United States Patent Office 3,343,014
Patented Sept. 19, 1967

3,343,014
SYNCHRONOUS MOTORS
Alan Robert Douglas Giles, Clayhall, Ilford, England, assignor to Plessey-UK Limited, Ilford, England, a British company
Filed Nov. 10, 1964, Ser. No. 410,139
1 Claim. (Cl. 310—49)

ABSTRACT OF THE DISCLOSURE

A synchronous motor comprising a permanent magnet rotor having two axially spaced cylindrical rotor pole pieces each of which is provided with axially extending teeth of uniform pitch, one rotor pole piece being angularly displaced by half a tooth pitch relative to the other rotor pole piece, a stator having a number of equiangularly spaced inwardly projecting stator poles each of which is provided with axially extending teeth of the same pitch as the teeth on the rotor pole pieces wherein the teeth on one single pair of diametrically opposite stator pole pieces and the teeth on another similarly related single pair of stator pole pieces displaced from one pair by 90° (mechanical) are alignable with teeth on the one and the other of the rotor pole pieces respectively.

---

The present invention is concerned with a synchronous inductor type of electric motor, and in particular to a D.C. stepping motor.

In synchronous motors the rotation is generally caused by the uni-directional magnetic field being attracted to and following a rotating magnetic field. The uni-directional field is produced by a permanent magnet forming part of the rotor or rotating element of the motor. The stator or stationary element of the motor has usually an even number of magnetic poles and a two-phase winding with alternate poles being energised by the same phase. When the windings are connected to a source of alternating current, during one half of the cycle of alternating current each of the poles will have a first magnetic polarity and on the other half of the cycle they will have the opposite polarity to the first. Thus in the poles energised by one phase of the winding one pole will for example be north, and the next one south, the next north during one half of a cycle and in the other half cycle they become south, north, south, etc. The poles energised by the other phase of the winding will have a similar magnetic polarity but 90° out of phase with the first set of poles. In the circumstances rotation is produced by the unidirectional field being first attracted and then repelled by the change in the polarity of the poles. The rotational speed of a motor with a constant cycle alternating source is varied by mechanical construction features such as the number of poles of the stator and the configuration of the rotor and stator poles.

When the synchronous motor is to be used as a D.C. stepping motor the two phases are energised with a centre-tapped D.C. source which can be derived from an A.C. input via a full-wave rectification arrangement. The centre tap of the source is connected to the common ends of the two phases and the opposite polarity poles of the D.C. are applied alternately to the two phases via a suitable switching arrangement.

In accordance with a feature of the invention there is provided a motor having a stator including a number of evenly-spaced inwardly projecting poles, the inner periphery of the poles lying on the circumference of a circle having a centre on the axis of rotation of the rotor of the motor, the inner face of each pole being formed with teeth of uniform pitch, the periphery of the rotor being formed with teeth having the same pitch as those on the stator poles and wherein the number of teeth on the stator poles, and the pitch of the poles are so related to the number of teeth on the rotor that at any one instant the teeth on two sets of diametrically opposite poles can fully align with a corresponding number of teeth on the rotor.

Figure 1:
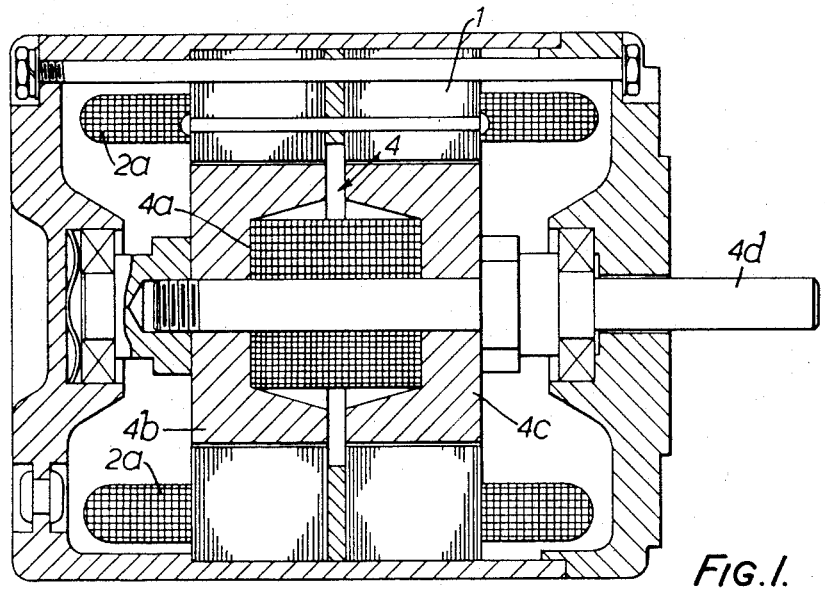
Figure 2:
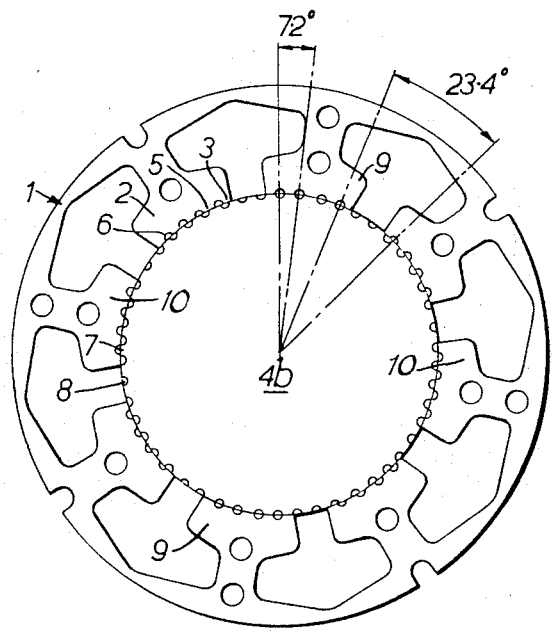
Figure 3:
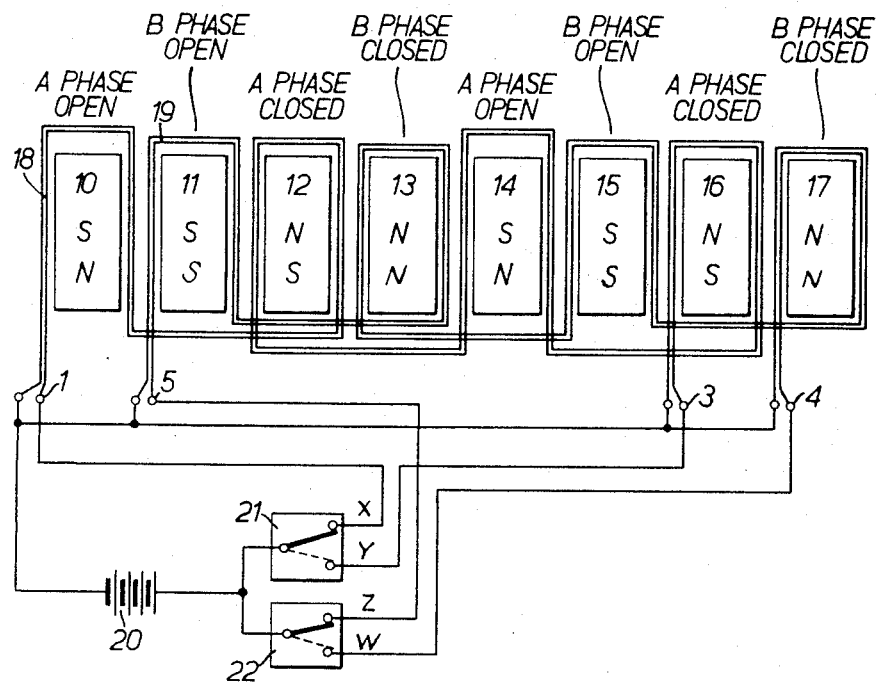

For a better understanding of the invention reference will now be made to the accompanying drawings in which, FIGURE 1 is an axial cross-section of a synchronous motor connected for operation as a stepping motor, FIGURE 2 is a simplified end view of the rotor and stator laminations, and FIGURE 3 is a diagram of the stator windings and connections.

A laminated stator 1 is formed so as to have eight equiangularly spaced inwardly projecting poles 2. The inner surface 3 of each pole is arcuate and lies on the circumference of a circle whose axis is coaxial with the axis of rotation of a rotor 4. A plurality of teeth 5 is formed on each pole 2 by forming in each of the pole surfaces 3 a number of axially directed slots 6. The pitches of the teeth 5 on each pole are the same.

The illustrated stator has five teeth per pole with a pitch of 23.4° from pole to pole: the pitch of each tooth being 7.2° from a point on one tooth to a corresponding point on an adjacent tooth, the angles being referred to the axis of the rotor 4.

Each pole carries a bifilar winding 2a. The relationships between the windings on the poles of the stator are illustrated in the bifilar winding diagram of FIGURE 3.

The rotor consists of a permanent magnet 4a with two axially spaced mild steel pole-pieces 4b and 4c mounted on a shaft 4d.

The pole pieces have on their periphery a plurality of radially directed, outwardly projecting teeth which extend longitudinally along the pole pieces. These teeth 7 are conveniently produced by forming a number of axially directed slots 8 in the surface of the pole pieces.

In the embodiment illustrated, each pole piece 4b or 4c has 50 teeth. The two pole pieces when assembled with the permanent magnet 4a are of the opposite polarity and are angularly misaligned to one another by ½ tooth pitch. This arrangement produces a rotor with 100 poles of alternate polarity each of 3.6° pitch.

The relationship between the pitch of the stator poles and the pitch of the poles on the rotor is such as to ensure that at any one instant, all the teeth on only two diametrically opposite stator poles such as 9 of north polarity align fully with the corresponding number of teeth on the rotor pole piece 4b which has south polarity. Similarly at 90° (mechanical) to this alignment there is a similar alignment of equal magnetic strength of two diametrically opposite stator poles 10 of south polarity with the rotor pole piece 4c which has north polarity. It will be appreciated that since stator poles 9 are positionally displaced by 90° from stator poles 10, an end view equivalent to FIGURE 2 but from the opposite end, will show the teeth of the stator poles 10 fully aligned with a corresponding number of teeth on the other rotor pole piece 4c.

Referring now particularly to FIGURE 3 the poles of the stator are represented by the rectangular blocks 10 to 17. The poles are wound so as to provide two separate phases, an A phase and a B phase, by means of two bifilar windings 18 and 19. It will be observed that the winding 18 is associated with the poles 10, 12, 14 and 16. The sense of the winding on the poles 12 and 16 is reversed with respect to that on the poles 10 and 14. The bifilar winding 19 is associated with the poles 11, 13, 15 and 17 with the sense of the windings on poles 11 and 15 reversed with respect to that of poles 13 and 17. Since the motor is to serve as a stepping motor the windings 18 and 19 are connected to be energised from a D.C. source 20 via a pair of double contact switches 21 and 22.

The contacts of the switches 21 and 22 are respectively identified as X, Y, W and Z. The switching sequence in order to produce 200 steps or stops and starts of the motor for a complete revolution of the motor is illustrated in the following table.

| Step | Switch 21 | Switch 22 |
|------|-----------|-----------|
| 1    | X         | Z         |
| 2    | Y         | Z         |
| 3    | Y         | W         |
| 4    | X         | W         |
| 5-1  | X         | Z         |

The polarities of the poles for the first step in which the switch 21 is connected to the contact X and the switch 22 is connected to the contact Z are illustrated in the rectangles 10 to 17 representing the poles. It will be appreciated that the switching sequence is of a cyclic character and because of this it is not thought necessary to explain the sequence in detail. It will be understood that the polarity of the poles will be reversed on each change of the switching sequence.

What I claim is:

An electric motor comprising a permanent magnet rotor having two axially spaced cylindrical rotor pole pieces formed on their respective peripheral surfaces with axially extending teeth of uniform pitch, the teeth on one of said rotor pole pieces being angularly displaced about the rotor axis by one half of the tooth pitch relative to the teeth on the other of said rotor pole pieces, a stator having a number of equiangularly spaced inwardly projecting stator poles the inner peripheral surface of which lies on the circumference of a circle having its centre on the axis of rotation of the rotor and is provided with axially extending stator pole teeth on each stator pole, said stator pole teeth having the same pitch as the said teeth on the rotor pole pieces, the pitch of the stator poles being so related to the number of teeth on each rotor pole piece, that all the teeth provided on only one pair of diametrically opposite stator pole pieces can fully align with a corresponding number of teeth on the said one rotor pole piece, and all the teeth provided on only one other pair of diametrically opposite stator pole pieces positionally displaced by 90° from the said one pair of pole pieces can fully align with a corresponding number of teeth on the said other rotor pole piece, said alignment occurring in each revolution of said rotor in a number of angular positions of said rotor corresponding to the number of stator poles.

References Cited

UNITED STATES PATENTS 2,982,872    5/1961    Fredrickson _____ 310—49

MILTON O. HIRSHFIELD, *Primary Examiner.*

L. L. SMITH, *Assistant Examiner.*